Aug. 2, 1966 R. G. H. WILLIAMS 3,263,936

TAPE CASSETTE

Filed Nov. 29, 1963 3 Sheets-Sheet 1

TAPE CASSETTE

Filed Nov. 29, 1963 3 Sheets-Sheet 2

Aug. 2, 1966 R. G. H. WILLIAMS 3,263,936

TAPE CASSETTE

Filed Nov. 29, 1963 3 Sheets-Sheet 3

United States Patent Office 3,263,936
Patented August 2, 1966

3,263,936
TAPE CASSETTE
Raymond G. H. Williams, Guildford, Surrey, England, assignor to Constance & Williams Limited, Hayes, Middlesex, England
Filed Nov. 29, 1963, Ser. No. 327,019
Claims priority, application Great Britain, Nov. 30, 1962, 45,364/62
2 Claims. (Cl. 242—55.13)

This invention relates to a cassette for containing a recording medium in the form of a tape or strip, for use with a device for recording information upon that medium and/or reproducing information previously recorded upon the medium.

The invention is primarily, although not exclusively, concerned with a cassette for magnetic tape and intended to be used with a magnetic tape deck for recording information upon the tape and subsequently playing back the recorded information.

It is an object of the present invention to provide an improved cassette for the above purposes.

The present invention consists in a cassette for a recording medium in the form of a tape or strip, which includes two hubs or spools located co-axially, one above the other, within a housing, and guiding means for guiding tape or strip wound upon one hub from that hub into an operative run, and from the operative run onto the other hub, wherein the tape or strip travels over the operative run in a direction at right angles to the axis of the hubs or spools and in a plane parallel to that axis, the operative run being disposed between the levels of the two hub or spools.

Figure 1:
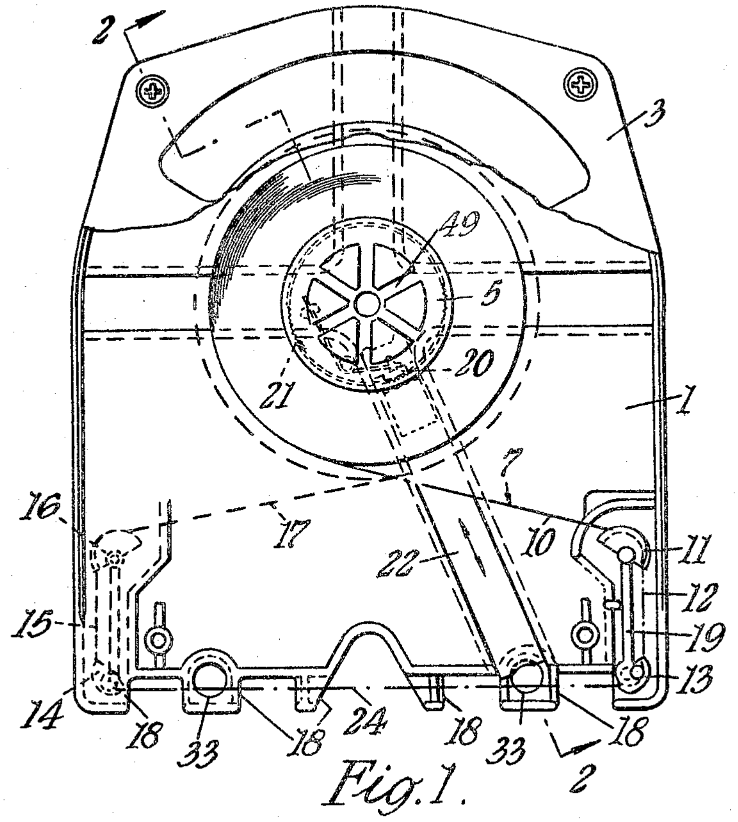
Figure 2:
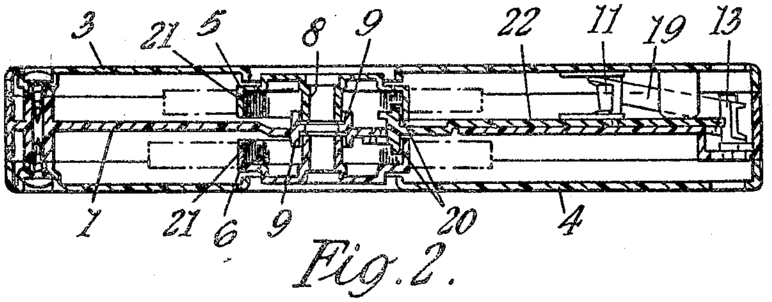
Figures 3, 4, 5:
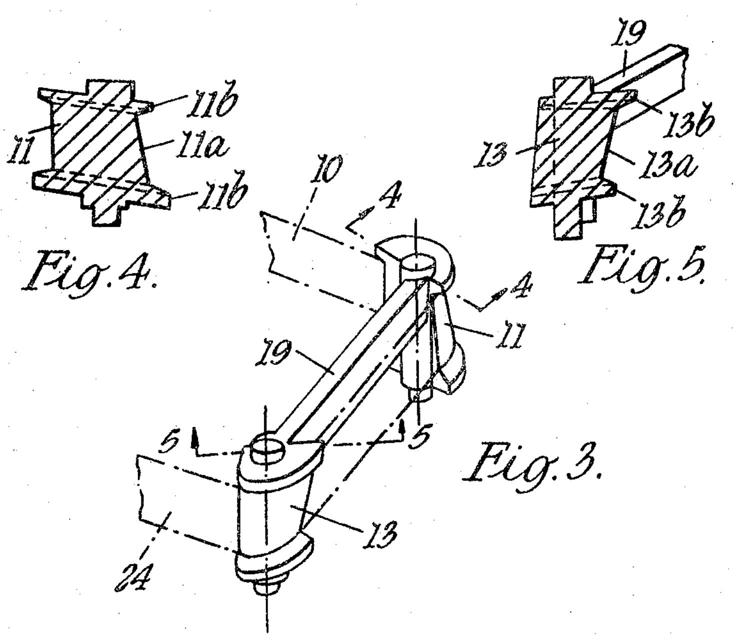
Figure 8:
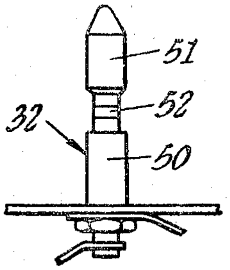
Figure 7:
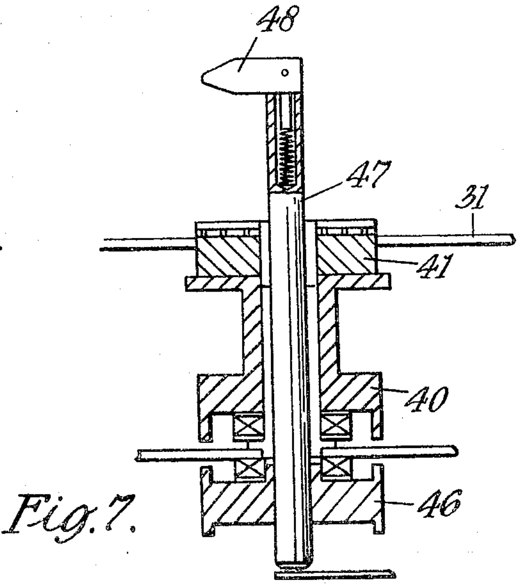
Figure 6:
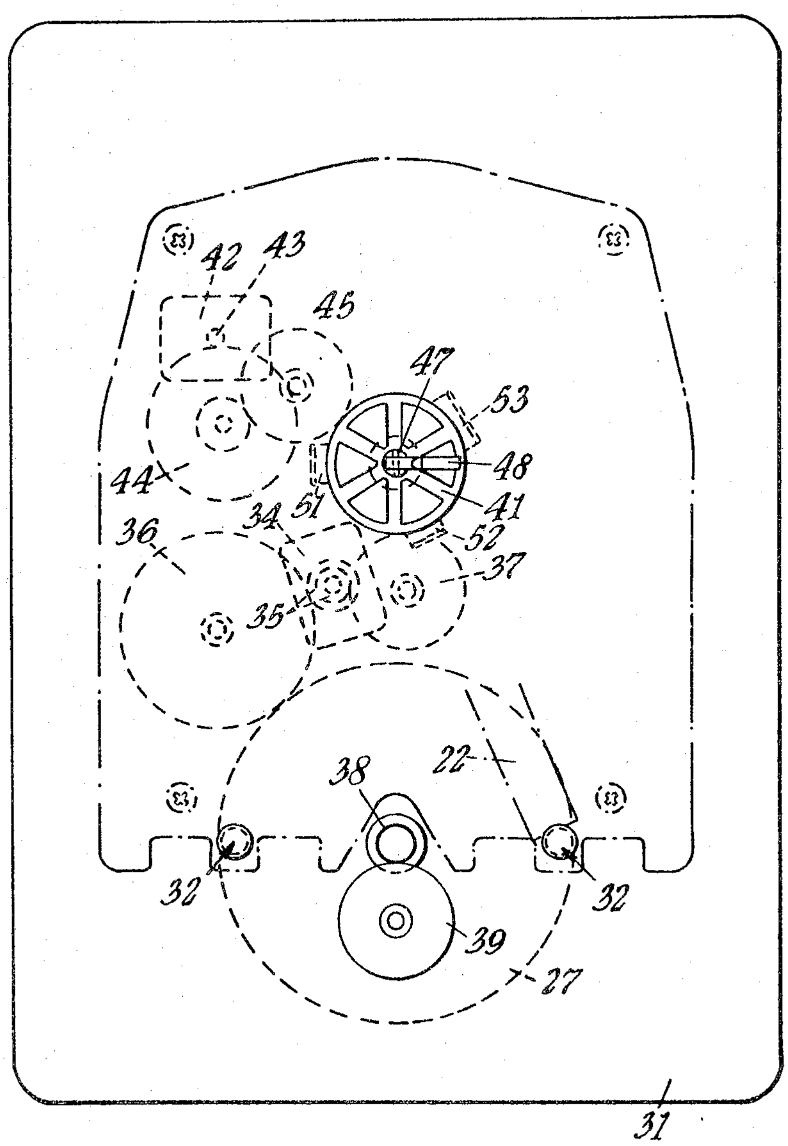

In the accompanying drawings:

FIGURE 1 is a plan view of a cassette according to the present invention, with a portion of its cover cut-away for clarity, FIGURE 2 is a section taken on line 2—2 of FIGURE 1, FIGURE 3 is a general view of the guiding means used in the cassette of FIGURE 1, FIGURE 4 is a section taken on line 4—4 of FIGURE 3, FIGURE 5 is a section taken on line 5—5 of FIGURE 3, FIGURE 6 is a diagrammatic plan view of a tape deck for use with the cassette of FIGURE 1, FIGURE 7 is a vertical section through a portion of FIGURE 6 showing the drives for the hubs of the cassette, and FIGURE 8 is a view of one locating post of the deck of FIGURE 6.

In carrying the invention into effect according to one convenient mode by way of example, as shown in FIGURES 1 and 2, a cassette for magnetic tape consists of a central plate 1 having secured to each side of it a transparent cover 3 or 4, so that an enclosed space is defined between each cover 3 and 4 and the plate 1. Hubs 5 and 6 are located, one in each space, so that magnetic tape 7 can be wound upon them, the tape extending from one hub to the other. Each of the hubs 5 and 6 is loosely mounted for rotation by means of a central tubular portion 8 which fits in a cup-shaped formation 9 upon the plate 1.

In passing between the hubs 5 and 6, the tape 7 passes over a number of regions in the following order:

(i) a feed run 10 between the periphery of the tape wound upon the hub 5 and a feed run guide post 11, (ii) a guide run 12 between the feed run guide post 11 and an operating run guide post 13, (iii) an operating run 24 between the operating run guide post 13 and a further operating run guide post 14, (iv) a further guide run 15 between the further operating run guide post 14 and a further feed run guide post 16, and (v) a further feed run 17 between the further feed run guide post 16 and the tape wound upon the hub 6.

In this way, during the operating run the tape is guided to travel in a direction at right angles to the axis of the hubs and in a plane parallel to the axis of the hubs, the operative run being disposed between the levels of the two hubs.

The casing is formed with re-entrant portions 18 to permit access to the tape over its operating run for recording, playback and capstan drive purposes.

As shown more clearly in FIGURE 3, the feed run guide post 11 and the operating run guide post 13 are rigidly joined together by means of an arm 19 integral with both.

It will be appreciated that since the feed run 10 is horizontal, and the operating run 24 is also horizontal, but at a lower level, then the guide run 12 must extend diagonally downwards, and the tape-contacting surfaces of the posts 11 and 13 must be suitably contoured to permit the tape to slide readily over them.

As shown in FIGURE 4, the tape-contacting surface **11*a* of the post 11 is inclined in an upward direction inwardly and rearwardly. It is desired that the minimum angle of contact around the post 11**, i.e., when the supply of tape upon hub is nearly exhausted, should be 60°.

As will be seen from FIGURE 5, the tape-contacting surface **13*a* of the post 13 is inclined in an upward direction outwardly and rearwardly. It is desired that the angle of contact around the post 13 should be at least 80°. It will be seen that a twist is imparted to the tape in passing between the posts 11 and 13**. It should be less than 45° and preferably about 28°.

Flanges **11*b* and 13*b* are provided upon the post 11 and 13** respectively to locate the tape in a vertical (axial) direction.

The hubs 5 and 6 are arranged to be braked by means of a serrated brake block 20 engaging the serrated inner surface of a flange 21 formed upon each hub 5 and 6. The brake blocks 20 are joined to a common operating arm 22.

FIGURE 6 shows a tape deck for use with the cassette described above. This consists essentially of a mounting board 31 having two upstanding locating posts 32 which pass through apertures 33 in the cassette and locate the cassette accurately with respect to recording and replying heads (not shown) on the deck. One locating post 32 also serves to engage the arm 22 and release the brake as soon as the cassette is applied to the deck.

The deck is provided with a main motor 34 having a stepped pulley 35 which drives a capstan drive pulley 36 and a rewind drive pulley 37. The capstan drive pulley 36 drives a capstan flywheel 27 connected to a capstan 38 co-operating with a pinch wheel 39 for driving the tape.

The rewind drive pulley 37 engages a rewind pulley 40 fractionally connected to a rewind drive pad and clutch 41 adapted to engage the lower of the two hubs of the cassette. The clutch 41 carries a spring or rubber loaded pin for engagement in a radial slot in the under surface of the lower hub.

The deck is also provided with a take-up motor 42 having a pulley 43 which drives a step-down pulley 44 which, in turn, drives a take-up drive pulley 45 arranged to drive a take-up pulley 46. The take-up pulley 46 is secured to a shaft 47 which passes through the central apertures of the hubs of the cassette and has a spring loaded arm 48 which can be moved to the position shown in FIGURE 7 after the cassette has been fitted on the deck. The arm 48 rests in one of a number of grooves

49 in the upper hub of the cassette for operative driving engagement therewith.

Pads 51, 52 and 53 are provided respectively for take-up back tension on the rewind pulley, rewind back tension on the take-up pulley, and braking for the take-up and rewind pulleys.

Suitable controls are provided in known manner for initiating drive and rewind of the tape using the components described above, as and when required.

FIGURE 8 shows in more detail one of the locating posts 32. These may be used to detect the presence of a portion of metal tape passing along the operating run and thereby initiating a further function such as braking or reversal of the tape drive. The post consists of two portions 50 and 51 with an insulator 52, and the metal tape can be arranged either to cause electrical connection between two insulated portions of the post or between the two posts, as desired.

Various modifications may be made within the scope of the present invention.

I claim:

1. A cassette for magnetic tape which includes a housing, first and second spool means mounted within said housing for independent rotation about a common axis, magnetic tape extending over a path between and in front of said spool means, first and second guide surface means positioned in spaced relationship in said path of said magnetic tape, each of said guide surface means being inclined in an upward direction outwardly and rearwardly when its associated spool means is uppermost and both of said guide surface means being aligned midway between the first and second spool means whereby said magnetic tape extends between said first and second guide surface means over an operative run in a direction at right angles to said common axis in a plane parallel to that axis, and third and fourth guide surface means positioned one between said first spool means and said first guide surface means and one between said second spool means and said second guide surface means, respectively, said third and fourth guide surface means being disposed in alignment with the adjacent spool means and guiding the magnetic tape between the adjacent spool means and guide surface means.

2. A cassette for magnetic tape which includes a housing, first and second spool means mounted within said housing for independent rotation about a common axis, magnetic tape extending over a path between and in front of said spool means, first and second guide surface means positioned in spaced apart relationship in said path of said magnetic tape, each of said guide surface means being inclined in an upward direction outwardly and rearwardly when its associated spool means is uppermost and both of said guide surface means being aligned midway between the first and second spool means whereby said magnetic tape extends between said first and second guide surface means over an operative run in a direction at right angles to said common axis in a plane parallel to that axis, and third and fourth guide surface means positioned one between the first spool means and guide means and one between the second spool means and guide means, each of said third and fourth guide means being inclined in an upward direction inwardly and rearwardly when its associated spool means is uppermost and each being disposed in alignment with its associated spool means and guiding the magnetic tape between the adjacent spool means and guide means.

References Cited by the Examiner

UNITED STATES PATENTS

| | | | |
|---|---|---|---|
| 2,866,010 | 12/1958 | Dale | 242—55.12 X |
| 2,941,737 | 6/1960 | Jones | 242—55.12 |
| 3,078,464 | 2/1963 | Lyon et al. | 242—55.13 |

MERVIN STEIN, *Primary Examiner.*

L. D. CHRISTIAN, *Assistant Examiner.*